United States Patent
Hsiao et al.

(10) Patent No.: US 8,510,326 B2
(45) Date of Patent: *Aug. 13, 2013

(54) PRIORITY DIMENSIONAL DATA CONVERSION PATH REPORTING

(75) Inventors: Sissie Ling-Ie Hsiao, Santa Clara, CA (US); Theodore Nicholas Choc, Palo Alto, CA (US); Cameron Michael Tangney, Sunnyvale, CA (US); Nicholas Seckar, Mountain View, CA (US)

(73) Assignee: Google Inc., Mountain View, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/084,413

(22) Filed: Apr. 11, 2011

(65) Prior Publication Data

US 2012/0259841 A1    Oct. 11, 2012

(51) Int. Cl.
*G06F 17/30* (2006.01)
(52) U.S. Cl.
USPC .............. 707/769; 705/14.41; 705/14.45
(58) Field of Classification Search
USPC ................................. 707/769; 705/14.45
See application file for complete search history.

(56) References Cited

U.S. PATENT DOCUMENTS

| | | | |
|---|---|---|---|
| 6,148,333 A | 11/2000 | Guedalia et al. | |
| 6,701,318 B2 | 3/2004 | Fox et al. | |
| 6,839,680 B1 | 1/2005 | Liu et al. | |
| 7,363,302 B2 | 4/2008 | Lester | |
| 7,523,191 B1 | 4/2009 | Thomas et al. | |
| 7,668,726 B2 | 2/2010 | Cardno et al. | |
| 7,917,382 B2 | 3/2011 | Cereghini et al. | |
| 8,259,722 B1 | 9/2012 | Kharitonov | |
| 2003/0025696 A1 | 2/2003 | Mulgan | |
| 2004/0043764 A1 | 3/2004 | Bigham et al. | |
| 2004/0085362 A1 | 5/2004 | Sauermann et al. | |
| 2005/0131762 A1 | 6/2005 | Bharat et al. | |

(Continued)

FOREIGN PATENT DOCUMENTS

| | | |
|---|---|---|
| JP | 2005-196675 | 7/2005 |
| KR | 10200727759 | 3/2007 |

(Continued)

OTHER PUBLICATIONS

Web-stat.net, Conversion and ROI Tracking, Nov. 3, 2004, accessed Aug. 6, 2012.*

(Continued)

*Primary Examiner* — William Spieler
(74) *Attorney, Agent, or Firm* — Foley and Lardner LLP; John D. Lanza

(57) ABSTRACT

Methods, systems, and apparatuses, including computer programs encoded on a computer storage medium, for providing data related to conversion paths. In one aspect, a plurality of conversion paths are received. Each conversion path includes one or more user interactions that include a plurality of dimensional data. A priority sorted list of dimensions is received and dimensional data is selected from each user interaction based on the sort list of dimensions. Each conversion path is converted into a dimensional path, and each dimensional path includes dimensional elements that corresponds to user interactions of the conversion path. Each dimensional element comprises the selected dimensional data from the corresponding user interaction. The plurality of dimensional paths are aggregated together based upon the number of dimensional elements within each dimensional path and the dimensional data of the dimensional elements. Reports can be generated using the aggregated dimensional data.

20 Claims, 9 Drawing Sheets

(56) References Cited

U.S. PATENT DOCUMENTS

| | | |
|---|---|---|
| 2005/0182676 A1 | 8/2005 | Chan |
| 2006/0132507 A1 | 6/2006 | Wang |
| 2006/0212350 A1 | 9/2006 | Ellis et al. |
| 2006/0216683 A1 | 9/2006 | Goradia |
| 2006/0218035 A1 | 9/2006 | Park et al. |
| 2006/0277211 A1 | 12/2006 | Error |
| 2007/0027768 A1 | 2/2007 | Collins et al. |
| 2007/0044133 A1 | 2/2007 | Hodecker |
| 2008/0046218 A1 | 2/2008 | Dontcheva et al. |
| 2008/0162699 A1 | 7/2008 | Gaffney |
| 2008/0172271 A1 | 7/2008 | Wee et al. |
| 2008/0215633 A1 | 9/2008 | Dunkeld et al. |
| 2009/0076886 A1 | 3/2009 | Dulitz et al. |
| 2009/0106081 A1 | 4/2009 | Burgess et al. |
| 2009/0192888 A1 | 7/2009 | Barton et al. |
| 2009/0292677 A1 | 11/2009 | Kim |
| 2010/0094704 A1 | 4/2010 | Subramanian et al. |
| 2010/0198680 A1 | 8/2010 | Ma et al. |
| 2010/0306276 A1 | 12/2010 | Davis et al. |
| 2011/0082858 A1 | 4/2011 | Yu et al. |
| 2011/0191343 A1 | 8/2011 | Heaton et al. |
| 2011/0231239 A1 | 9/2011 | Burt et al. |
| 2011/0307515 A1 | 12/2011 | Chen et al. |
| 2012/0159637 A1 | 6/2012 | Dove et al. |

FOREIGN PATENT DOCUMENTS

| | | |
|---|---|---|
| KR | 10200756047 | 5/2007 |
| KR | 10-2007-0111647 | 11/2007 |
| KR | 10200889616 | 10/2008 |
| KR | 102008103605 | 11/2008 |
| KR | 10-2008-114804 | 12/2008 |
| KR | 1020093377 | 1/2009 |
| KR | 2009-0090032 | 8/2009 |
| KR | 10-0928198 | 11/2009 |
| KR | 10-2010-101707 | 9/2010 |

OTHER PUBLICATIONS

PPCHero.com, Review Your Conversion Paths To Look For Optimization Opportunities, Feb. 10, 2009, accessed Aug. 6, 2012.*
International Search Report and Written Opinion for PCT/US2011/054000, date of mailing Apr. 19, 2012, 9 pages.
International Search Report and Written Opinion for PCT/US2011/053837, dated Sep. 26, 2012.
International Search Report and Written Opinion for PCT/US2011/053838, dated Feb. 27, 2012.
International Search Report and Written Opinion for PCT/US2011/053934, dated Aug. 29, 2012.
International Search Report and Written Opinion for PCT/US2011/053973 application, dated May 14, 2012.
International Search Report and Written Opinion for PCT/US2011/054007, dated Aug. 28, 2012.
International Search Report and Written Opinion for PCT/US2011/054065, date of mailing Apr. 19, 2012.
Office Action on U.S. Appl. No. 13/084,530 dated Aug. 13, 2012.
Office Action on U.S. Appl. No. 13/084,537 dated Aug. 14, 2012.
International Search Report and Written Opinion for PCT/US2011/054069, mail date May 16, 2012, 17 pages.
US Notice of Allowance on U.S. Appl. No. 13/084,546 DTD Apr. 8, 2013.
US Office Action on U.S. Appl. No. 13/206,402 DTD Apr. 25, 2013.
US Office Action on U.S. Appl. No. 13/084,530 DTD Apr. 5, 2013.
US Office Action on U.S. Appl. No. 13/184,772 DTD Jan. 29, 2013.
US Office Action on U.S. Appl. No. 13/084,530 DTD Mar. 5, 2013.
US Office Action on U.S. Appl. No. 13/084,537 DTD Mar. 8, 2013.
US Office Action on U.S. Appl. No. 13/084,546 DTD Jan. 10, 2013.

* cited by examiner

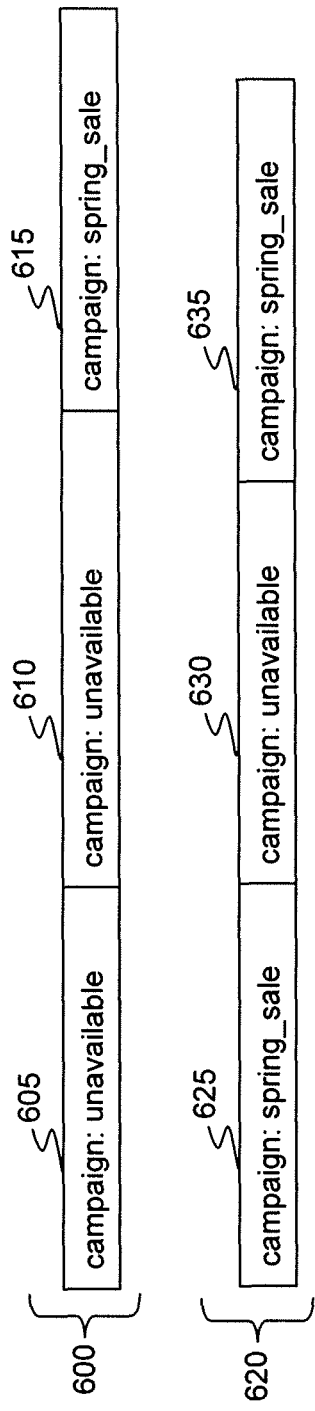
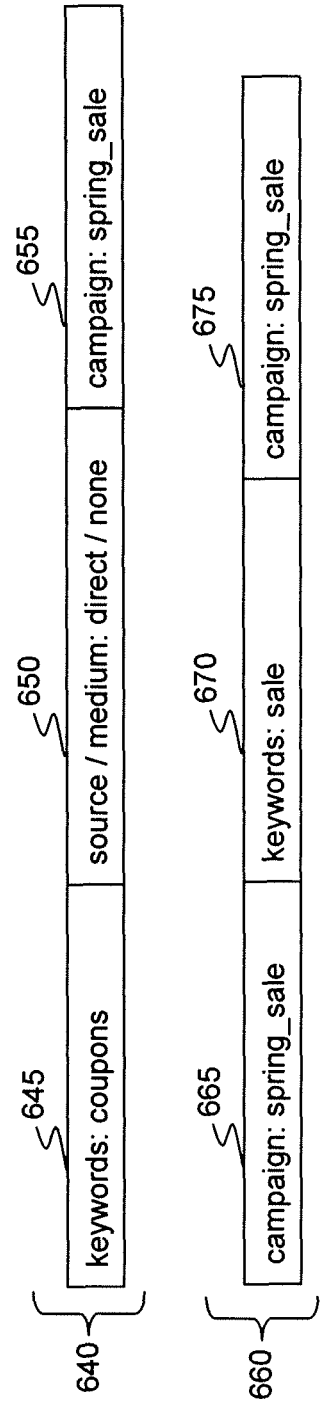
FIG. 6A
FIG. 6B

| Dimensional Path | Conversions | Conversion Value |
|---|---|---|
| spring_sale > unavailable > spring_sale | 346 | $3,959 |
| unavailable > unavailable > spring_sale | 321 | $2,310 |
| unavailable > unavailable | 109 | $1,123 |

PRIORITY DIMENSIONAL DATA CONVERSION PATH REPORTING

BACKGROUND

The internet provides access to a wide variety of content. For instance, images, audio, video, and web pages for a myriad of different topics are accessible through the Internet. The accessible content provides an opportunity to place advertisements. Advertisements can be placed within content, such as a web page, image or video, or the content can trigger the display of one or more advertisements, such as presenting an advertisement in an advertisement slot.

Advertisers decide which ads are displayed within particular content using various advertising management tools. These tools also allow an advertiser to track the performance of various ads or ad campaigns. The parameters used to determine when to display a particular ad can also be changed using advertising management tools.

The data that is used to generate the performance measures for the advertiser generally includes all data that is available. This data usually includes a combination of data from multiple servers. The amount of the combined data is large enough that performance measures generated from the data can be used to provide an efficient way of understanding the data. Processing of the data to generate useful and accurate performance measures involves a number of obstacles. For instance, if a performance measure is based upon a user's actions over a period of time, the user's actions should be tracked. A cookie can be used to track a user's actions over a period of time. However, if this cookie is removed during the period of time, collection of accurate data tracking the user's actions may be disrupted. The data can contain record user actions that include various actions that are significant to an advertiser. These actions, which can be any recordable event, are called conversions. Identifying other actions that contribute to the occurrence of conversions is valuable. The data, however, contains numerous actions that could be associated with conversions. In addition, the data may also contain information regarding user actions that do not contribute to any recorded conversions. Thus, processing the data to provide accurate and reliable performance measures based upon all the available information regarding user actions has a number of challenges.

SUMMARY

In general, one innovative aspect of the subject matter described in this specification can be embodied in methods in which a plurality of conversion paths is received. Each conversion path includes one or more user instructions that include a plurality of dimensional data. A priority sorted list of dimensions is received and dimensional data is selected from each user interaction based on the sort list of dimensions. Each conversion path is converted into a dimensional path, and each dimensional path includes dimensional elements that correspond to user interactions of the corresponding conversion path. Each dimensional element comprises the selected dimensional data from the corresponding user interaction. The plurality of dimensional paths are aggregated together based upon the number of dimensional elements within each dimensional path and the dimensional data of the dimensional element. The aggregated dimensional data can be provided, for example, by generating a report. Other embodiments of this aspect include corresponding systems, apparatus, and computer-readable medium, configured to perform the actions of this method.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

FIGS. 6A and 6B are block diagrams that illustrate dimensional paths in accordance with an illustrative embodiment.

FIGS. 7A and 7B illustrate portions of a dimensional path report in accordance with an illustrative embodiment.

Like reference numbers and designations in the various drawings indicate like elements.

DETAILED DESCRIPTION

Content providers (e.g., advertisers) are provided various reports that disclose various user interactions with content. Each user interaction can include a number of dimensions, which can contain data associated with the user interaction. Such dimensions, however, can be sparsely populated. Reports can be generated using a single dimension of the user interactions and, therefore, may also be sparsely populated. A priority list of dimensions can be used to generate a report that is less sparsely populated and can provide an adequate level of detail in the report.

As used throughout this document, user interactions include any presentation of content to a user and any subsequent affirmative actions or non-actions (collectively referred to as "actions" unless otherwise specified) that a user takes in response to presentation of content to the user (e.g., selections of the content following presentation of the content, or no selections of the content following the presentation of the content). Thus, a user interaction does not necessarily require a selection of the content (or any other affirmative action) by the user.

User interaction measures can include one or more of time lag measures (i.e., measures of time from one or more specified user interactions to a conversion), path length measures (i.e., quantities of user interactions that occurred prior to conversions), user interaction paths (i.e., sequences of user interactions that occurred prior to the conversion), assist interaction measures (i.e., quantities of particular user interactions that occurred prior to the conversion), and assisted conversion measures (i.e., quantities of conversions that were assisted by specified content).

Figure 1:
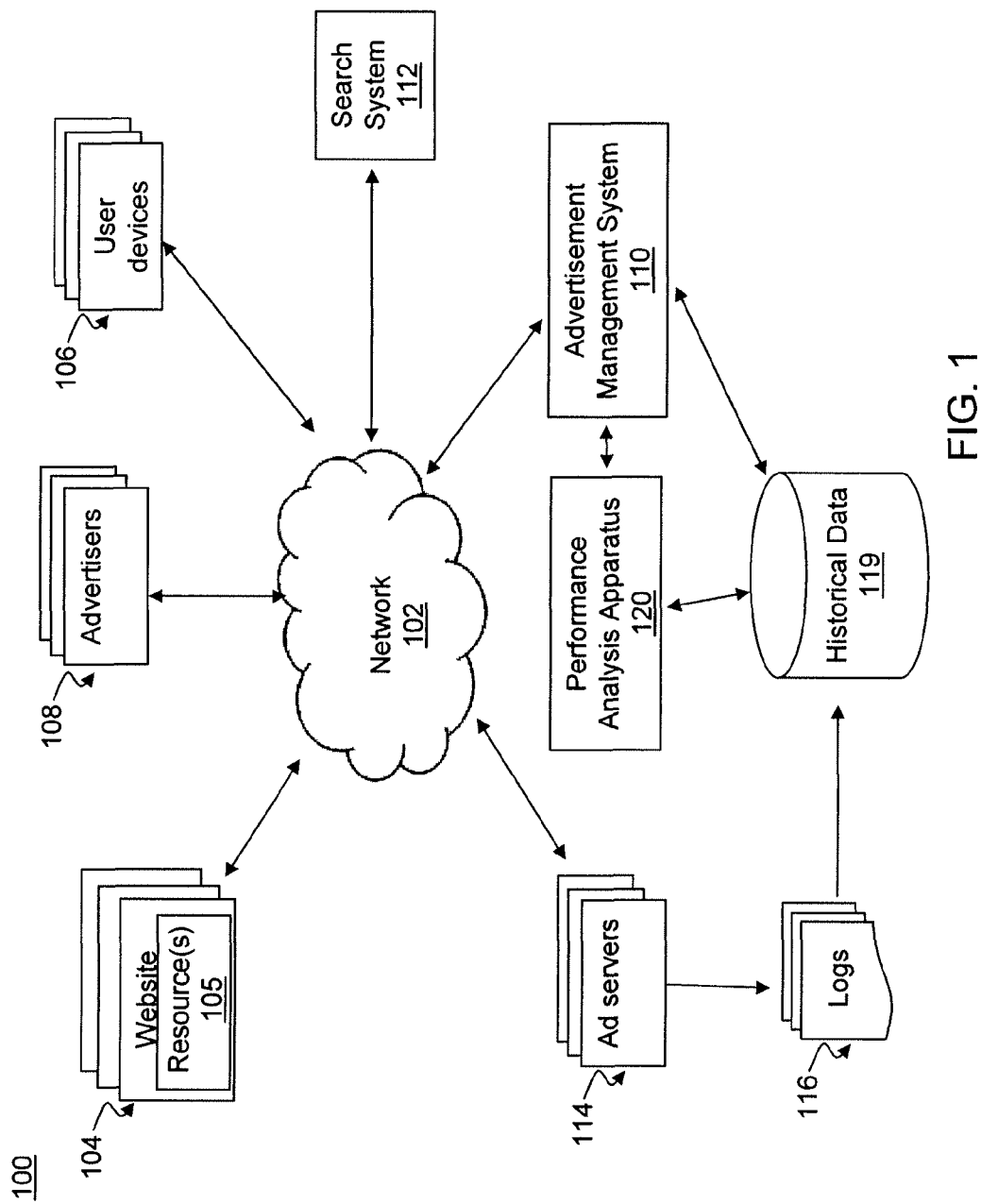
FIG. 1 is a block diagram of an example environment in which an advertisement management system manages advertising services in accordance with an illustrative embodiment.

FIG. 1 is a block diagram of an example environment in which an advertisement management system manages advertising services in accordance with an illustrative embodiment. The example environment 100 includes a network 102, such as a local area network (LAN), a wide area network (WAN), the Internet, or a combination thereof. The network 102 connects websites 104, user devices 106, advertisers 108, and an advertisement management system 110. The example environment 100 may include many thousands of websites 104, user devices 106, and advertisers 108.

A website 104 includes one or more resources 105 associated with a domain name and hosted by one or more servers. An example website is a collection of web pages formatted in hypertext markup language (HTML) that can contain text, images, multimedia content, and programming elements, such as scripts.

A resource 105 is any data that can be provided over the network 102. A resource 105 is identified by a resource address that is associated with the resource 105, such as a uniform resource locator (URL). Resources 105 can include web pages, word processing documents, portable document format (PDF) documents, images, video, programming elements, interactive content, and feed sources, to name only a few. The resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages such as JavaScript® or ECMAScript®.

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can include data specifying a portion of the resource or a portion of a user display (e.g., a presentation location of a pop-up window or in a slot of a web page) in which advertisements can be presented. These specified portions of the resource 105 or user display are referred to as advertisement slots.

To facilitate searching of the vast number of resources 105 accessible over the network 102, the environment 100 can include a search system 112 that identifies the resources 105 by crawling and indexing the resources 105 provided on the websites 104. Data about the resources 105 can be indexed based on the resource 105 with which the data is associated. The indexed and, optionally, cached copies of the resources 105 are stored in a search index (not shown).

User devices 106 can submit search queries to the search system 112 over the network 102. In response, the search system 112 accesses the search index to identify resources 105 that are relevant to the search query. In one illustrative embodiment, a search query includes one or more keywords. The search system 112 identifies the resources 105 that are responsive to the query, provides information about the resources 105 in the form of search results and returns the search results to the user devices 106 in search results pages. A search result can include data generated by the search system 112 that identifies a resource 105 that is responsive to a particular search query, and can include a link to the resource 105. An example search result can include a web page title, a snippet of text or a portion of an image extracted from the web page 104, a rendering of the resource 105, and the URL of the web page 104. Search results pages can also include one or more advertisement slots in which advertisements can be presented.

A search result page can be sent with a request from the search system 112 for the web browser of the user device 106 to set an HTTP (HyperText Transfer Protocol) cookie. A cookie can represent, for example, a particular user device 106 and a particular web browser. For example, the search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie can store a variety of data, including a unique or semi-unique identifier. The unique or semi-unique identifier can be anonymized and is not connected with user names. Because HTTP is a stateless protocol, the use of cookies allows an external service, such as the search system 112 or other system, to track particular actions and status of a user over multiple sessions. A user may opt out of tracking user actions, for example, by disabling cookies in the browser's settings.

When a resource 105 or search results are requested by a user device 106 or provided to the user device 106, the advertisement management system 110 receives a request for advertisements to be provided with the resource 105 or search results. The request for advertisements can include characteristics of the advertisement slots that are defined for the requested resource 105 or search results page, and can be provided to the advertisement management system 110. For example, a reference (e.g., URL) to the resource 105 for which the advertisement slot is defined, a size of the advertisement slot, and/or media types that are available for presentation in the advertisement slot can be provided to the advertisement management system 110. Similarly, keywords (i.e., one or more words that are associated with content) associated with a requested resource 105 ("resource keywords") or a search query for which search results are requested can also be provided to the advertisement management system 110 to facilitate identification of advertisements that are relevant to the resource 105 or search query.

Based on data included in the request for advertisements, the advertisement management system 110 can select advertisements that are eligible to be provided in response to the request ("eligible advertisements"). For example, eligible advertisements can include advertisements having characteristics matching the characteristics of advertisement slots and that are identified as relevant to specified resource keywords or search queries. In some implementations, advertisements having targeting keywords that match the resource keywords, the search query, or portions of the search query are selected as eligible advertisements by the advertisement management system 110.

The advertisement management system 110 selects an eligible advertisement for each advertisement slot of a resource 105 or of a search results page. The resource 105 or search results page is received by the user device 106 for presentation by the user device 106. User interaction data representing user interactions with presented advertisements can be stored in a historical data store 119. For example, when an advertisement is presented to the user via an ad server 114, data can be stored in a log file 116. This log file 116, as more fully described below, can be aggregated with other data in the historical data store 119. Accordingly, the historical data store 119 contains data representing the advertisement impression. For example, the presentation of an advertisement is stored in response to a request for the advertisement that is presented. For example, the ad request can include data identifying a particular cookie, such that data identifying the cookie can be stored in association with data that identifies the advertisement(s) that were presented in response to the request. In some implementations, the data can be stored directly to the historical data store 119.

Similarly, when a user selects (i.e., clicks) a presented advertisement, data representing the selection of the advertisement can be stored in the log file 116, a cookie, or the historical data store 119. In some implementations, the data is stored in response to a request for a web page that is linked to by the advertisement. For example, the user selection of the advertisement can initiate a request for presentation of a web page that is provided by (or for) the advertiser. The request can include data identifying the particular cookie for the user device, and this data can be stored in the advertisement data store.

User interaction data can be associated with unique identifiers that represent a corresponding user device with which the user interactions were performed. For example, in some implementations, user interaction data can be associated with one or more cookies. Each cookie can include content which specifies an initialization time that indicates a time at which the cookie was initially set on the particular user device 106.

The log files 116, or the historical data store 119, also store references to advertisements and data representing conditions under which each advertisement was selected for presentation to a user. For example, the historical data store 119 can store targeting keywords, bids, and other criteria with which eligible advertisements are selected for presentation. Additionally, the historical data store 119 can include data that specifies a number of impressions for each advertisement and the number of impressions for each advertisement can be tracked, for example, using the keywords that caused the advertisement impressions and/or the cookies that are associated with the impressions. Data for each impression can also be stored so that each impression and user selection can be associated with (i.e., stored with references to and/or indexed according to) the advertisement that was selected and/or the targeting keyword that caused the advertisement to be selected for presentation.

The advertisers 108 can submit, to the advertisement management system 110, campaign parameters (e.g., targeting keywords and corresponding bids) that are used to control distribution of advertisements. The advertisers 108 can access the advertisement management system 110 to monitor performance of the advertisements that are distributed using the campaign parameters. For example, an advertiser can access a campaign performance report that provides a number of impressions (i.e., presentations), selections (i.e., clicks), and conversions that have been identified for the advertisements. The campaign performance report can also provide a total cost, a cost-per-click, and other cost measures for the advertisement over a specified period of time. For example, an advertiser may access a performance report that specifies that advertisements distributed using the phrase match keyword "hockey" have received 1,000 impressions (i.e., have been presented 1,000 times), have been selected (e.g., clicked) 20 times, and have been credited with 5 conversions. Thus, the phrase match keyword hockey can be attributed with 1,000 impressions, 20 clicks, and 5 conversions.

As described above, reports that are provided to a particular content provider can specify performance measures measuring user interactions with content that occur prior to a conversion. A conversion occurs when a user performs a specified action, and a conversion path includes a conversion and a set of user interactions occurring prior to the conversion by the user. Any user interaction or user interactions can be deemed a conversion. What constitutes a conversion may vary from case to case and can be determined in a variety of ways. For example, a conversion may occur when a user clicks on an advertisement, is referred to a web page or website, and then consummates a purchase there before leaving the web page or website. As another example, a conversion may occur when a user spends more than a given amount of time on a particular website. Data from multiple user interactions can be used to determine the amount of time at the particular website.

Actions that constitute a conversion can be specified by each advertiser. For example, each advertiser can select, as a conversion, one or more measurable/observable user actions such as, for example, downloading a white paper, navigating to at least a given depth of a website, viewing at least a certain number of web pages, spending at least a predetermined amount of time on a website or web page, or registering on a website. Other actions that constitute a conversion can also be used.

To track conversions (and other interactions with an advertiser's website), an advertiser can include, in the advertiser's web pages, embedded instructions that monitor user interactions (e.g., page selections, content item selections, and other interactions) with advertiser's website, and can detect a user interaction (or series of user interactions) that constitutes a conversion. In some implementations, when a user accesses a web page, or another resource, from a referring web page (or other resource), the referring web page (or other resource) for that interaction can be identified, for example, by execution of a snippet of code that is referenced by the web page that is being accessed and/or based on a URL that is used to access the web page.

For example, a user can access an advertiser's website by selecting a link presented on a web page, for example, as part of a promotional offer by an affiliate of the advertiser. This link can be associated with a URL that includes data (i.e., text) that uniquely identifies the resource from which the user is navigating. For example, the link http://www.example.com/homepage/%affiliate_identifier%promotion_1 specifies that the user navigated to the example.com web page from a web page of the affiliate that is associated with the affiliate identifier number that is specified in the URL, and that the user was directed to the example.com web page based on a selection of the link that is included in the promotional offer that is associated with promotion_1. The user interaction data for this interaction (i.e., the selection of the link) can be stored in a database and used, as described below, to facilitate performance reporting.

When a conversion is detected for an advertiser, conversion data representing the conversion can be transmitted to a data processing apparatus ("analytics apparatus") that receives the conversion data, and in turn, stores the conversion data in a data store. This conversion data can be stored in association with one or more cookies for the user device that was used to perform the user interaction, such that user interaction data associated with the cookies can be associated with the conversion and used to generate a performance report for the conversion.

Typically, a conversion is attributed to a targeting keyword when an advertisement that is targeted using the targeted keyword is the last clicked advertisement prior to the conversion. For example, advertiser X may associate the keywords "tennis," "shoes," and "Brand-X" with advertisements. In this example, assume that a user submits a first search query for "tennis," the user is presented a search result page that includes advertiser X's advertisement, and the user selects the advertisement, but the user does not take an action that constitutes a conversion. Assume further that the user subsequently submits a second search query for "Brand-X," is presented with the advertiser X's advertisement, the user selects advertiser X's advertisement, and the user takes action that constitutes a conversion (e.g., the user purchases Brand-X tennis shoes). In this example, the keyword "Brand-X" will be credited with the conversion because the last advertisement selected prior to the conversion ("last selected advertisement") was an advertisement that was presented in response to the "Brand-X" being matched.

Providing conversion credit to the keyword that caused presentation of the last selected advertisement ("last selection credit") prior to a conversion is a useful measure of advertisement performance, but this measure alone does not provide advertisers with data that facilitates analysis of a conversion cycle that includes user exposure to, and/or selection of, advertisements prior to the last selected advertisement. For example, last selection credit measures alone do not specify keywords that may have increased brand or product awareness through presentation of advertisements that were presented to, and/or selected by, users prior to selection of the last selected advertisement. However, these advertisements may have contributed significantly to the user subsequently taking action that constituted a conversion.

In the example above, the keyword "tennis" is not provided any credit for the conversion, even though the advertisement that was presented in response to a search query matching the keyword "tennis" may have contributed to the user taking an action that constituted a conversion (e.g., making a purchase of Brand-X tennis shoes). For instance, upon user selection of the advertisement that was presented in response to the keyword "tennis" being matched, the user may have viewed Brand-X tennis shoes that were available from advertiser X. Based on the user's exposure to the Brand-X tennis shoes, the user may have subsequently submitted the search query "Brand-X" to find the tennis shoes from Brand-X. Similarly, the user's exposure to the advertisement that was targeted using the keyword "tennis," irrespective of the user's selection of the advertisement, may have also contributed to the user subsequently taking action that constituted a conversion (e.g., purchasing a product from advertiser X). Analysis of user interactions, with an advertiser's advertisements (or other content), that occur prior to selection of the last selected advertisement can enhance an advertiser's ability to understand the advertiser's conversion cycle.

A conversion cycle is a period that begins when a user is presented an advertisement and ends at a time at which the user takes action that constitutes a conversion. A conversion cycle can be measured and/or constrained by time or actions and can span multiple user sessions. User sessions are sets of user interactions that are grouped together for analysis. Each user session includes data representing user interactions that were performed by a particular user and within a session window (i.e., a specified period). The session window can be, for example, a specified period of time (e.g., 1 hour, 1 day, or 1 month) or can be delineated using specified actions. For example, a user search session can include user search queries and subsequent actions that occur over a 1 hour period and/or occur prior to a session ending event (e.g., closing of a search browser).

Analysis of a conversion cycle can enhance an advertiser's ability to understand how its customers interact with advertisements over a conversion cycle. For example, if an advertiser determines that, on average, an amount of time from a user's first exposure to an advertisement to a conversion is 20 days, the advertiser can use this data to infer an amount of time that users spend researching alternative sources prior to converting (i.e., taking actions that constitute a conversion). Similarly, if an advertiser determines that many of the users that convert do so after presentation of advertisements that are targeted using a particular keyword, the advertiser may want to increase the amount of money that it spends on advertisements distributed using that keyword and/or increase the quality of advertisements that are targeted using that particular keyword.

Measures of user interactions that facilitate analysis of a conversion cycle are referred to as conversion path performance measures. A conversion path is a set of user interactions by a particular user prior to and including a conversion by the particular user. Conversion path performance measures specify durations of conversion cycles, numbers of user interactions that occurred during conversion cycles, paths of user interactions that preceded a conversion, numbers of particular user interactions that occurred preceding conversions, as well as other measures of user interaction that occurred during conversion cycles, as described in more detail below.

The advertisement management system 110 includes a performance analysis apparatus 120 that determines conversion path performance measures that specify measures of user interactions with content items during conversion cycles. The performance analysis apparatus 120 tracks, for each advertiser, user interactions with advertisements that are provided by the advertiser, determines (i.e., computes) one or more conversion path performance measures, and provides data that cause presentation of a performance report specifying at least one of the conversion path performance measures. Using the performance report, the advertiser can analyze its conversion cycle, and learn how each of its keywords cause presentation of advertisements that facilitate conversions, irrespective of whether the keywords caused presentation of the last selected advertisement. In turn, the advertiser can adjust campaign parameters that control distribution of its advertisements based on the performance report.

Configuration options can be offered to reduce bias in performance reports. Without configuration options, some performance reports can be biased, such as towards short conversion paths. For example, a performance report can be biased towards short conversion paths if data used as a basis for the report includes a percentage of partial conversion paths which is higher than a threshold percentage. A partial conversion path is a conversion path in which some but not all user interaction data for a user is associated with a conversion. A partial conversion path can be included in a report if, for example, the report is generated using a reporting period which is less then the length of a typical conversion cycle for the advertiser who requested the report.

A reporting period determines the maximum length (in days) of a reported conversion cycle because additional data outside of the reporting period is not used to generate the report. A performance report can be based on a reporting period (i.e., lookback window), such that user interactions prior to the reporting period are not considered part of the conversion cycle when generating the report. Such a reporting period is referred to as a "lookback window". For example, when generating a report with a lookback window of thirty days, available user interaction data representing user actions that occurred between July 1 and July 31 of a given year would be available for a conversion that occurred on July 31 of that year.

If a default lookback window (e.g., thirty days) is used, the performance report can be biased towards short conversion paths if the typical conversion cycle length for a product associated with the report is greater than the default lookback window. For instance, in the example above, a typical conversion cycle for "Brand-X" tennis shoes may be relatively short (e.g., thirty days) as compared to a conversion cycle for a more expensive product, such as a new car. A new car may have a much longer conversion cycle (e.g., ninety days).

Different advertisers or different products for an advertiser can have different associated conversion cycle lengths. For example, an advertiser that sells low cost (e.g., less than $100) products may specify a lookback window of 30 days, while an advertiser that sells more expensive products (e.g., at least $1000) may specify a lookback window of 90 days.

In some implementations, an advertiser 108 can specify a lookback window to use when requesting a performance report, such as by entering a number of days or by selecting a lookback window from a list of specific lookback windows (e.g., thirty days, sixty days, ninety days). Allowing an advertiser to configure the lookback window of their performance reports enables the advertiser to choose a lookback window that corresponds to conversion cycles of their products. Allowing lookback window configuration also enables advertisers to experiment with different lookback windows, which can result in the discovery of ways to improve conversion rates.

Other factors can contribute to reporting on partial conversion paths. For example, as mentioned above, user interaction data used as a basis for a report can be associated with unique identifiers that represent a user device with which the user interactions were performed. As described above, a unique identifier can be stored as a cookie. Cookies can be deleted from user devices, such as by a user deleting cookies, a browser deleting cookies (e.g., upon browser exit, based on a browser preference setting), or some other software (e.g., anti-spyware software) deleting cookies.

If cookies are deleted from a user device, a new cookie will be set on the user's device when the user visits a web page (e.g., the search system 112). The new cookie may be used to store a new quasi-unique identifier, and thus subsequent user interaction data that occurs on the user device may be associated with a different identifier. Therefore, because each user identifier is considered to represent a different user, the user interaction data associated with the deleted cookies are identified as being associated with a different user than the user interaction data that is associated with the new cookies.

For instance, in the example above, assume that the user deletes cookies after the first search query for "tennis" is performed and that the second search query for "Brand-X" occurs after the cookies are deleted. In this example, performance measures computed based on the user interaction data for the user can show a bias. For example, a path length measure can be computed as one, rather than two, since the advertisement selection resulting from the first search query is not considered part of the same conversion cycle as the advertisement selection resulting from the second search query, since the two user interactions do not appear to have been performed by the same user.

To view a report which reduces bias caused from partial conversion paths, an advertiser can specify a lookback window for the report. As described above, the lookback window specifies that the user interaction data used to generate the report are user interaction data that are associated with unique identifiers that have initialization times that are prior to a specified period (e.g., thirty days, sixty days, ninety days) before the conversions. Thus, conversions for which user interaction data that are associated with unique identifiers having initialization times that are after the specified period are excluded from inclusion as a basis for the report. A unique identifier that has a recent initialization time indicates that the unique identifier may have been recently reinitialized on the user device that the unique identifier represents. Accordingly, user interaction data associated with the relatively new unique identifier may represent only a partial conversion path. Alternatively, conversions for which user interaction data that are associated with unique identifiers having initialization times that are after the specified period are included in the report. To reduce bias, any user interaction included in the conversion path that occurred after the specified period are removed from the conversion path prior to being included in the report.

Figure 2:
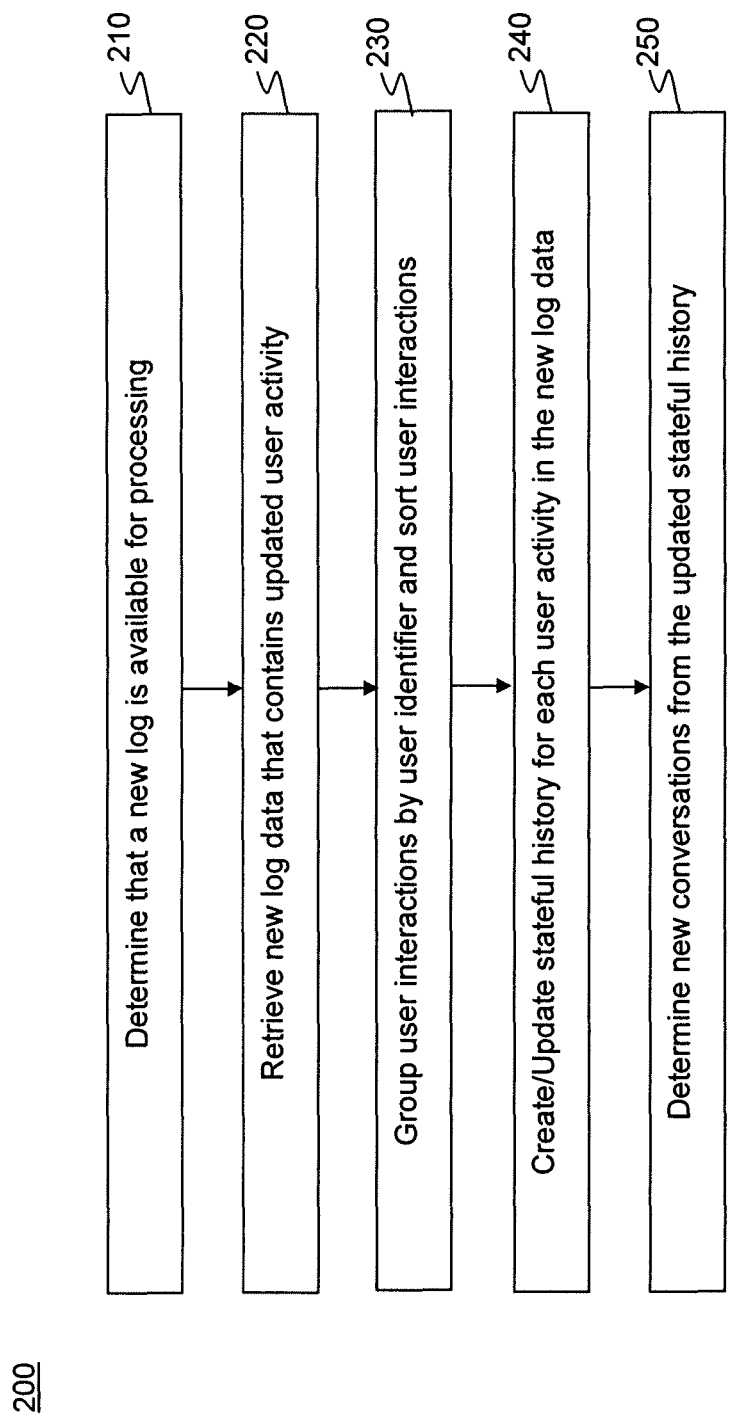
FIG. 2 is a flow diagram of a process for integrating user interaction log data in accordance with an illustrative embodiment.

FIG. 2 is a flow diagram of a process for integrating user interaction log data in accordance with an illustrative embodiment. The process 200 is a process that updates conversion paths and determines conversions based upon the updated conversion paths of users.

The process 200 can be implemented on the advertisement management system 110, the performance analysis apparatus 120, or another computing device. In one implementation, the process 200 is encoded on a computer-readable medium that contains instructions that when executed by a computing device cause the computing device to perform operations of process 200.

As described above, log files 116 may contain user interaction data. A log file 116 may be combined with user interaction data from other logs from other servers, including those that implement the search system 112, prior to processing. Processing starts with the computing device that implements the process 200 determining that a new log is available for processing (210). For example, a notification can be sent to the computing device indicating that a new log is ready for processing, or the existence of a new log can indicate that the new log is ready for processing.

Figure 3:
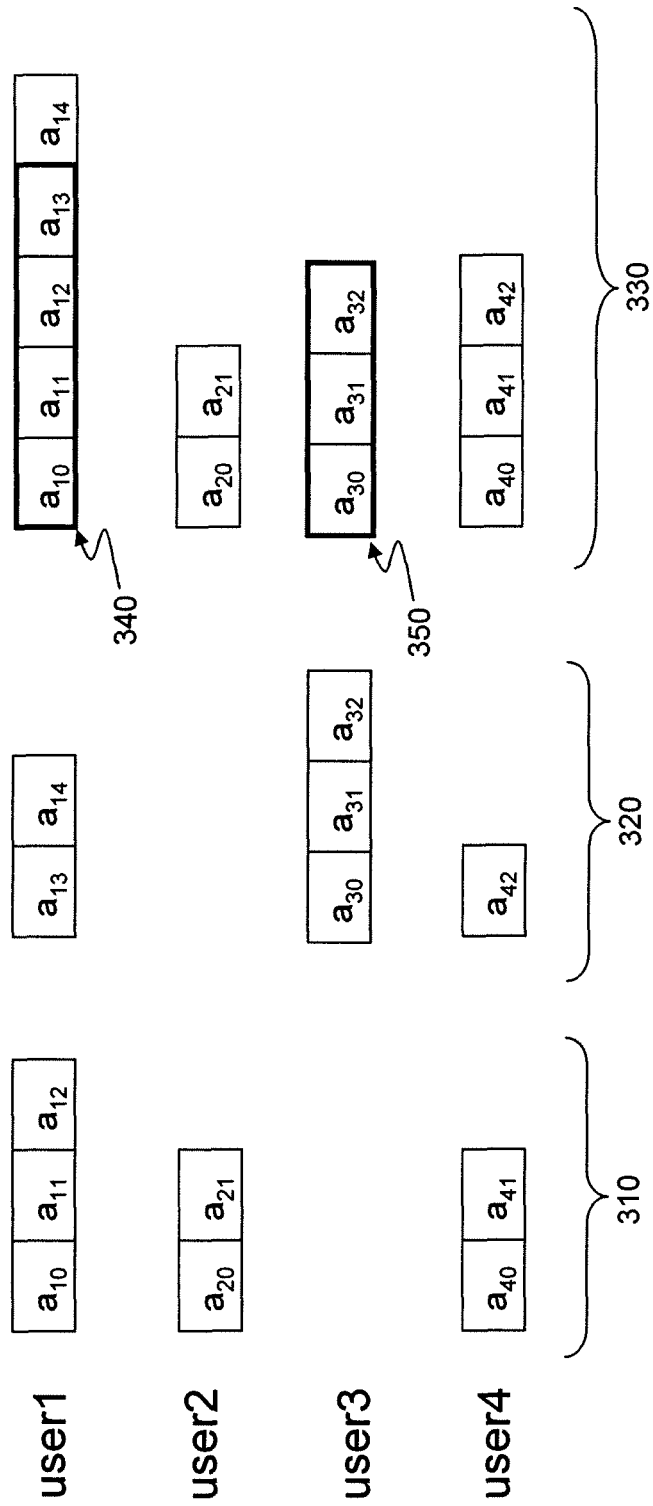
FIG. 3 is a block diagram that illustrates user interaction data being updated during a user interaction log data integration process in accordance with an illustrative embodiment.

Next, the new log is retrieved (220). The new log may be retrieved over the network 102. The stateful history for each user is updated based upon the user activity indicated by the new log. The new log can contain information relating to user interactions for numerous users. The historical data store 119 contains user interaction data from previously processed log files. The user interaction data contained within the historical data store 119 can be stateful, in that the user interaction data can be grouped by user identifier and ordered chronologically. FIG. 3 is a block diagram that illustrates user interaction data being updated during a user interaction log data integration process 200 in accordance with an illustrative embodiment. FIG. 3 illustrates four example user identifiers, although the historical data store 119 and log files 116 can contain data associated with thousands or millions of different user identifiers. In one embodiment, previously stored user interaction data 310 are stored in the historical data store 119. As illustrated, no user interaction data associated with user identifier 3 has been previously stored in the historical data store 119.

The new log can contain user interaction data for one or more user identifiers. The user interaction data can be grouped by user identifiers and then sorted chronologically (230). Column 320 illustrates grouped and sorted user interaction data. As illustrated, user identifier 2 does not include any new user interaction data, and user identifiers 1, 3, and 4 have updated user interaction data. For instance, the new log file includes user interaction data associated with user interactions $a_{13}$ and $a_{14}$ that are associated with user identifier 1. The grouped and sorted user interaction data can then merged with the user interaction data stored in the historical data store 119 (240). If a user identifier previously existed in the historical data store 119, the new user interaction data are added to the previous user interaction data. Otherwise, the new user interaction data is added with a new user identifier.

Column 330 illustrates the updated user interaction data for each of the user identifiers. Based upon the updated user interaction data, any conversions that occurred in each of the updated paths of user interactions can be determined (250). User interaction paths are constrained to those user interactions that are related to a particular advertiser 108. The conversion interactions of the particular advertiser 108 are used to determine if a conversion has occurred. As an example, assume that user interactions $a_{13}$ and $a_{32}$ represent conversion interactions. Accordingly, conversion paths 340 and 350 are found. Once found, the conversion paths can be written to another portion of the historical data store 119 or another data store for further analysis.

Each user interaction includes a set of data or dimensions associated with the user interaction. The dimensions can be sparsely populated, such that, any user interaction may have data relating to a subset of the dimensions. A large number of conversion paths can be generated based upon received user interaction data. Various reports regarding how a campaign or an advertiser's placements are performing can include various information regarding the conversion paths. Given the large potential number of conversion paths, various conversion paths can be grouped together to reduce the number of distinct conversion paths that are reported. In an illustrative embodiment, conversion paths that have the same number of user interactions and have corresponding data can be aggregated.

Dimensional data of user interactions can be sparsely populated. Using a single dimension to aggregate conversion paths can result in a large number of aggregated conversion paths that do not have data associated with the aggregated dimension. In an illustrative embodiment, multiple dimensions can be used to aggregate various conversion paths. A sorted list of dimensions can be used to determine, for each user interaction, a first matching dimension that contains data. If there is no matching dimension for any particular user interaction a default dimension or data value can be specified. For instance, a default dimension that is not sparsely populated can be used as the default dimension or a text string, such as, "unavailable," "(none)," or " " can be used as a default value.

Using the sorted list of dimensions, each conversion path can be converted into a dimensional path. A dimensional path contains dimensional elements that correspond to the user interactions of a conversion path. The dimensional element can contain or reference data from the first dimension that contains data from the corresponding user interaction. For instance, assume the sorted list of dimensions contains $dimension_1$ $dimension_2$, and $dimension_3$ and a user interaction contains data in $dimension_2$, and $dimension_3$ but not in $dimension_1$. A dimensional element corresponding to this user interaction would contain or reference the $dimension_2$ data from the user interaction, since $dimension_2$ was the first dimension of the user interaction that contained data. A dimension is not limited to having data from a single dimension. For instance, the data from multiple dimensions can be combined into a dimension. In addition, the dimensional element may contain additional information from the user interaction beyond the first matching dimension.

In one embodiment, conversion paths are converted into dimensional paths by adding a reference to the dimensional data to each of the user interactions. In another embodiment, dimensional paths that are separate from the conversion paths are created. In this embodiment, the dimensional paths can be stored in a location different from the location that stores the conversion paths. Regardless of how the dimensional paths are implemented, the dimensional paths can be aggregated based upon the length and the dimensional elements of the dimensional paths.

In one embodiment, the dimensional elements contain the dimensional data as well as other data from the corresponding user interaction. For example, a conversion interaction can include a value associated with the conversion. As the dimensional paths are aggregated, the value of all conversion paths associated with the aggregated dimensional paths can be also be aggregated. This aggregated value can be included in a report.

In addition to including dimensional data and other user interaction data, each dimensional element can include an indication relating to which dimensional data is contained within the dimensional element. In one embodiment, this indication indicates if the first dimension, or primary dimension, in the sorted list of dimensions is used to provide the dimensional data. In another embodiment, the indication relates to the level or the number of the dimension in the sorted list of dimensions that is used to provide the dimensional data. For example, the indication can be 1, 2, 3, 4, or default, to indicate if the first, second, third, fourth, or default dimension was used to populate the dimensional data. This indication can be used to provide a visual indicator in a report as to which dimension was used. In one embodiment, a dimensional element that is populated with the primary dimension can be visually indicated by a solid-line box around the reported dimensional element. A non-primary dimension can be indicated with a broken-link box. In another embodiment, different colors can serve as the visual indicator.

Figure 4:
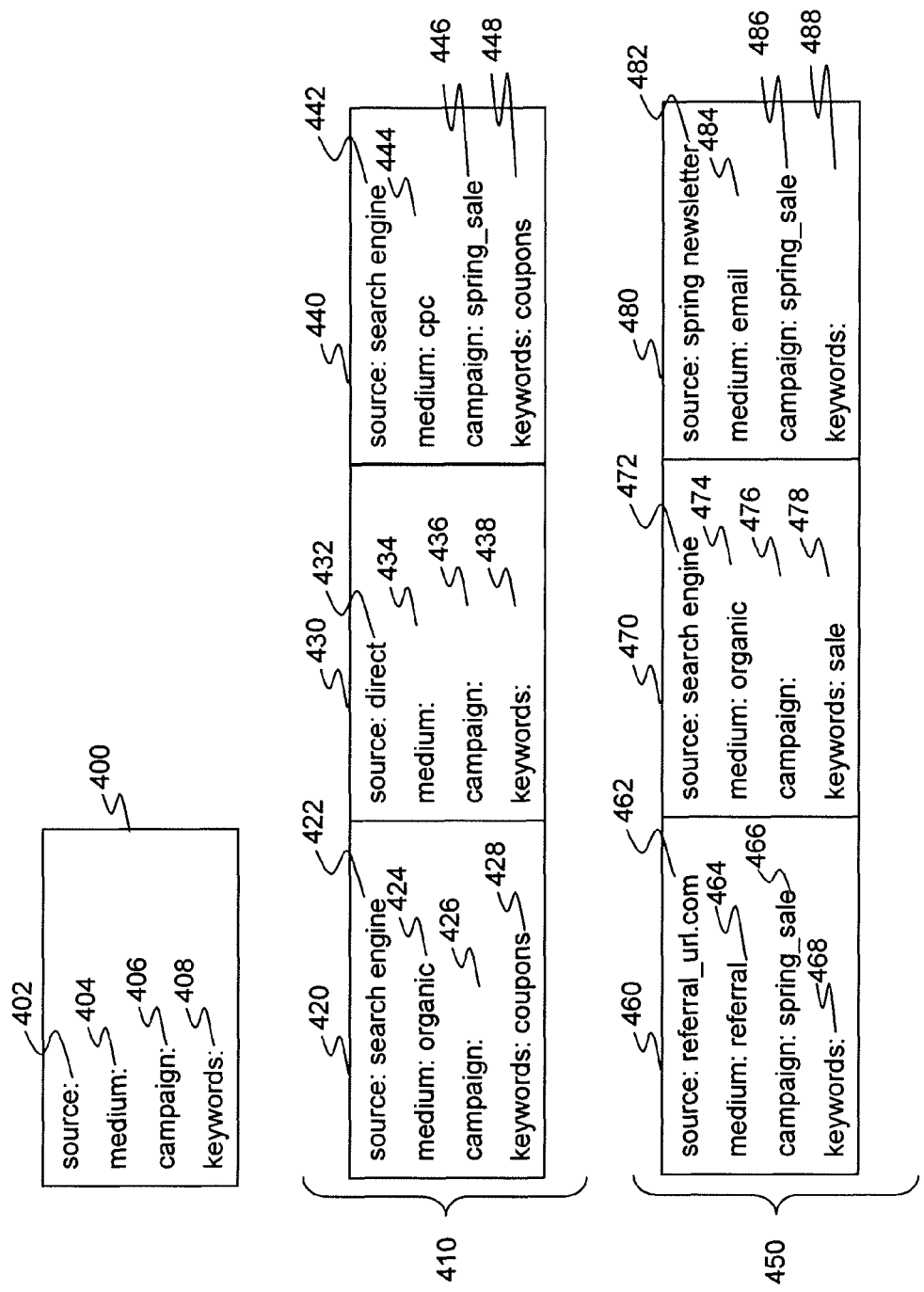
FIG. 4 is a block diagram that illustrates data associated with user interactions in accordance with an illustrative embodiment.

FIG. 4 is a block diagram that illustrates data associated with user interactions in accordance with an illustrative embodiment. A shell or form user interaction 400 illustrates four possible dimensions that can be associated with any user interaction. As illustrated, each user interaction can have a dimension related to a user interaction's source 402, medium 404, campaign 406, and keywords 408. The source dimension 402 indicates the source of a referral to a website. The medium dimension 404 provides further information regarding the source dimension 402. For instance, the source dimension 402 can indicate a particular search engine as the referring source, and the medium dimension 404 can further classify the source as being "cost-per-click" if the user clicked on a sponsored link or "organic" if the user clicked on an unpaid search results link. The campaign dimension 406 allows an advertiser to differentiate between various advertising campaigns. For example, an advertiser may have two concurrently running advertising campaigns that refer users to one or more common page(s). The campaign dimension 406 allows the various user interactions related to the campaigns to be separated from one another. This gives an advertiser the ability to analyze the campaigns independently of one another, even though both campaigns drive users to the same common pages. The keyword dimension 408 contains any word or phrase the user used in a search. The available dimensions are not limited to these examples. For example, the dimensions relating to a user interaction can include, but are not limited to, a date of the user interaction, a time of the user interaction, country/territory, landing page title, browser name, browser version, content, etc. For example, a user interaction can include content dimension that allows an advertiser to indicate a version of the advertisement that the user clicked.

Conversion path 410 illustrates three user interactions 420, 430, and 440. User interaction 420 has dimensional data associated with the source dimension 422, the medium dimension 424, and the keywords dimension 428. The campaign dimension 426, however, has no associated data. In an illustrative embodiment, the user interaction 420 can be associated with a user searching using the keyword "coupon" in a search engine. The unpaid search results contain a link to the advertiser's website, which the user clicked upon. User interaction 430 provides an example of a user interaction whose dimensions are sparsely populated. Only the source dimension 432 has associated data. The remaining dimensions, 434, 436, and 438 do not have any associated dimensional data. User interaction 430 can correspond to, but is not limited to, a user visiting an advertiser's web page by typing the advertiser's web page address or URL directly into an address tool of a web browser. The third user interaction 440 in the conversion path 410 has all of the illustrated dimensions 442, 444, 446, and 448 populated with dimensional data. User interaction 440 can be associated with, but is not limited to, a user clicking on an advertising link that directs the user to the advertiser's web page. The advertising link is associated with the search results of a keyword search using "coupons" as the keyword in the search engine. Finally, the campaign dimension 446 indicates that the clicked advertising link corresponds to a "spring_sale" campaign.

Conversion path 450 illustrates another conversion path that includes three user interactions 460, 470, and 480. User interaction 460 has dimensional data associated with the source dimension 462, the medium dimension 464, and the campaign dimension 466. The keywords dimension 468 does not have any associated data. The medium dimension 464 indicates that a user was referred to an advertiser's web page based upon the referral_url.com web page based upon the source dimension 462. The keywords dimension 468 being empty can signify that a user did not do a keyword search associated with the referring site to navigate to the advertiser's web page. A user interaction 470 has dimensional data associated with the source dimension 472, the medium dimension 474, and the keywords dimension 478. The campaign dimension 476 has no associated data. In an illustrative embodiment, the user interaction 470 can correspond to a user visiting an advertiser's web page by clicking on an unpaid search result from a search engine using the keyword "sale." User interaction 480 can be associated with a newsletter that contains a link to the advertiser's web page. The medium dimension 484 is set to "email" and indicates that the user navigated to the advertiser's web page from an email newsletter that corresponds to the "spring newsletter," based upon the source dimension 482. User interaction 480 also is related to the "spring_sale" campaign as indicated by the campaign dimension 486.

Conversion paths 410 and 450 are two illustrative conversion paths. An advertiser is likely to have a significantly larger number of conversion paths. Individual conversion paths can also include fewer or more user interactions than those illustrated in FIG. 4, and fewer or more dimensions. Given the number of conversion paths for a particular advertiser, reporting on each individual conversion path can be overwhelming. To provide useful reporting metrics, the multitude of conversion paths can be aggregated together before a report is generated. Prior to such aggregation, however, the conversion paths can be filtered based upon various criteria. For instance, the conversion paths can be filtered by, but not limited to, conversion path length, time lag measurements, source dimension, medium dimension, campaign dimension, keywords dimension, any other user interaction dimension, etc.

Figure 5:
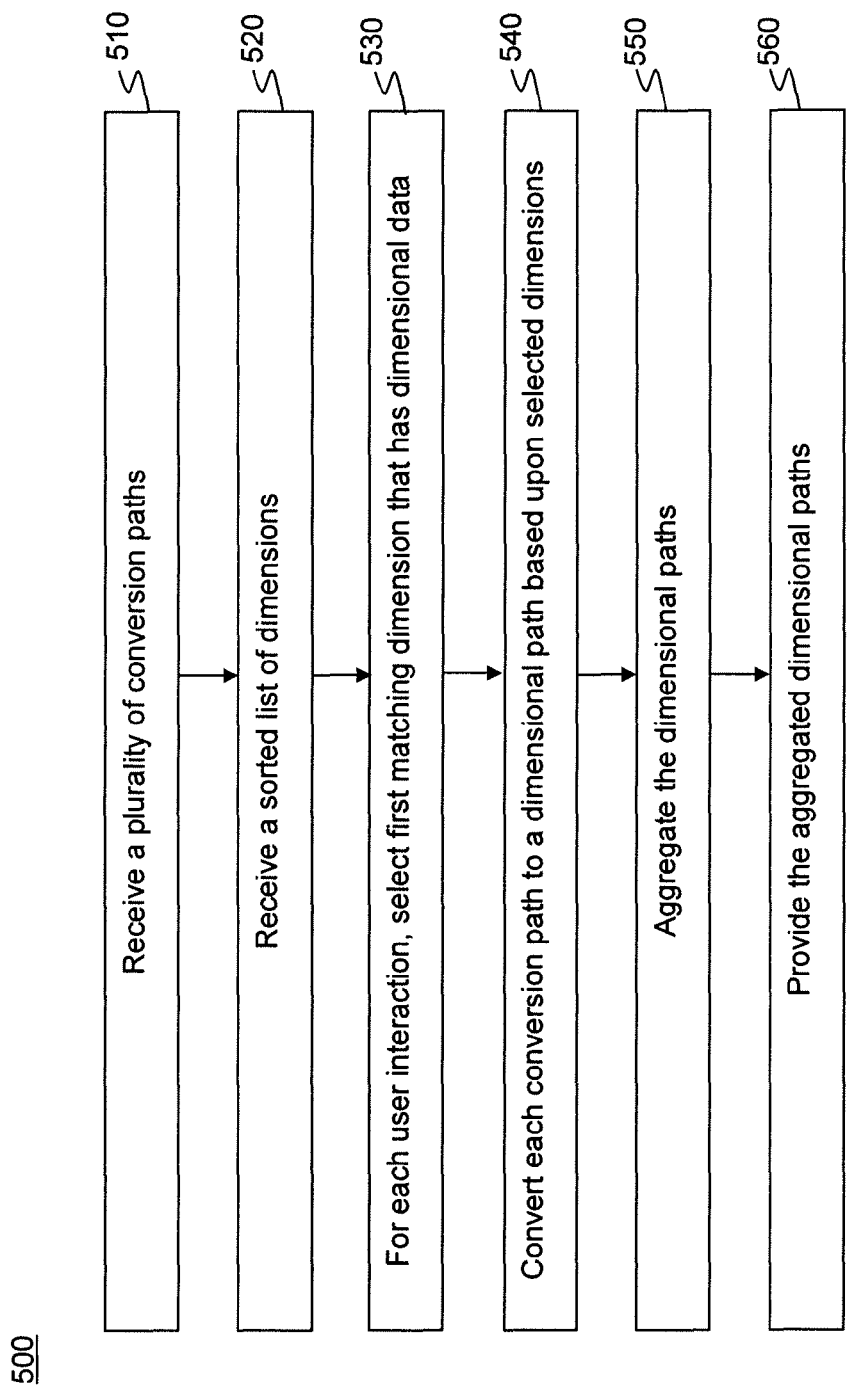
FIG. 5 is a flow diagram of a process for converting conversion paths into dimensional paths in accordance with an illustrative embodiment.

For each conversion path that is to be included in any particular report, the conversion paths can be converted into a dimensional path. FIG. 5 is a flow diagram of a process for converting conversion paths into dimensional paths in accordance with an illustrative embodiment. The process 500 can be implemented on the advertisement management system 110, the performance analysis apparatus 120, or another computing device. In one implementation, the process 500 is encoded on a computer-readable medium that contains instructions that when executed by a computing device cause the computing device to perform operations of process 500.

A selection of conversion paths is retrieved from a data store, such as the historical data store 119 (510). The selection of conversion paths can include filtering of unwanted conversion paths such as those that appear to be invalid or do not meet some initial search or filter criteria. For example, all conversion paths that have conversions in the past 30 days can be selected. A sorted list of dimensions is also received (520). The sorted list of dimensions can be based upon a user selection of the sorted list of dimensions. For each user interaction in each of the received conversion paths, the sorted dimensions list is used to find the first dimension in the user interaction that contains data (530). The conversion paths next are converted into dimensional paths (540). A dimensional path is created for each of the received conversion paths. Each dimensional path includes one or more dimensional elements that correspond to the user interactions of the conversion path. The dimensional elements include the selected dimensional data from the corresponding user interaction. In one embodiment, creating dimensional elements is done concurrently with the creating of dimensional paths. The dimensional paths can then be aggregated together (540). In one embodiment, the dimensional paths are aggregated based upon the length of the dimensional paths and the dimensional data of the dimensional elements. The aggregated dimensional paths can then be provided (550), for example, to a requesting user or including the aggregated dimensional paths in a report.

FIGS. 6A and 6B are block diagrams that illustrate dimensional paths in accordance with an illustrative embodiment. The illustrated dimensional paths can be generated from conversion paths using the process 500 as described above. In one embodiment, the list of dimensions used to generate the dimensional paths is based upon receiving user selections and ordering of the dimensions. FIG. 6A illustrates the dimensional paths 600 and 620 that correspond to conversion paths 410 and 450, respectively. A list of dimensions that includes only the campaign dimension is used to convert the conversion paths 410 and 450 into dimensional paths 600 and 620. Using a single dimension results in the dimensional paths 600 and 620 being sparsely populated, with dimensional elements 605, 610, and 630 not containing any data related to a campaign dimension. Dimensional elements 605, 610, and 630 do not contain campaign dimensional data because the corresponding user interactions 420, 430, and 470 do not contain campaign dimensional data. In contrast, dimensional elements 615, 625, and 635 correspond to user interactions 440, 460, and 480 that include campaign dimensional data. When aggregating the conversion paths, paths with unavailable data can be grouped together, regardless of the other dimensional data in the corresponding user interactions. Such grouping can lead to useful data not being readily apparent.

FIG. 6B illustrates two dimensional paths 640 and 660 that are also generated from the conversion paths 410 and 450, respectively. Instead of having a prioritized list of dimensions that contains a single dimension, a list of dimensions that includes the campaign dimension, the keywords dimension, and a combined source/medium dimension is used to create dimensional paths 640 and 660. Comparing the dimensional paths 600 and 620 with the dimensional paths 640 and 660, the dimensional paths 640 and 660 contain more dimensional data. Thus, when the dimensional paths are aggregated together, there will likely be more groups and more dimensional data provided. As the campaign dimension is the primary dimension, dimensional elements 655, 665, and 675 contain the same dimensional data as dimensional items 615, 625, and 635. The remaining dimensional elements of dimension paths 640 and 660, however, contain dimensional data instead of null entries such as "unavailable." The second dimension from the dimensional list is the keyword dimension. User interactions 420 and 470 contain keyword dimensional data but do not contain campaign dimensional data. Accordingly, the corresponding dimensional elements 645 and 670 are populated with the corresponding keyword data. Dimensional element 650 corresponds to the user interaction 430, which contains neither campaign nor keyword dimensional data. As the last dimension is the combined source/medium dimensions, dimensional element 650 contains "direct/none" based upon the dimensional data from user interaction 430. As illustrated by dimensional element 650, a dimensional element can include a combination of dimensional data from a user interaction. Once a group of conversion paths are converted into dimensional paths, the dimensional paths can be grouped together. The grouped dimensional paths can be used to generate a report regarding the dimensional paths.

Figure 7B:
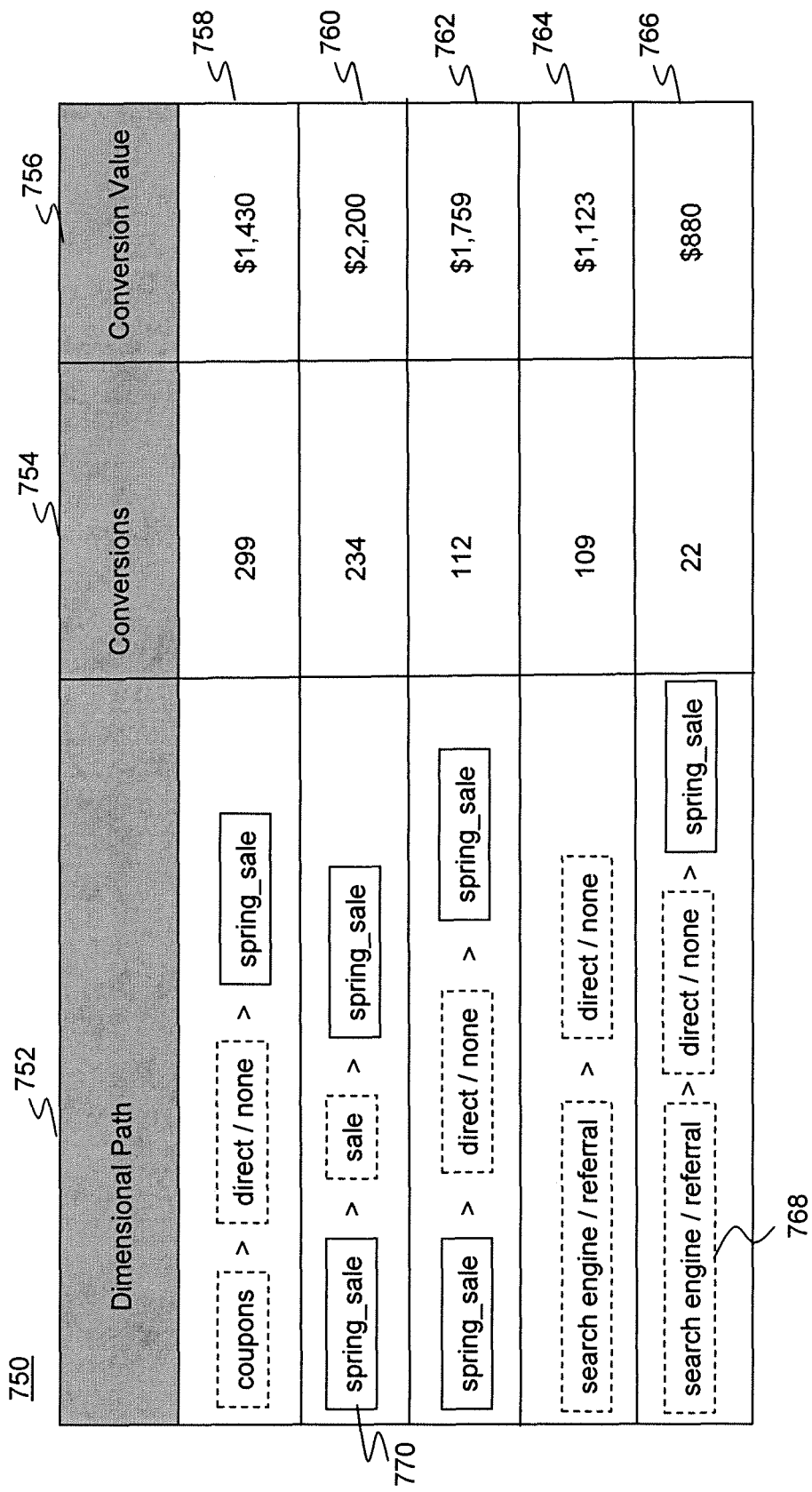

FIGS. 7A and 7B illustrate portions of a dimensional path report in accordance with an illustrative embodiment. FIG. 7A illustrates a portion of a dimensional path report 700 based on aggregated dimensional paths converted from conversion paths as discussed with respect to FIG. 6A. The portion of the report 700 includes three columns corresponding to a dimensional path 702, a number of conversions of the particular dimensional path 704, and a value of those conversions 706. The portion of the report 700 illustrated includes data aggregated from 776 different dimensional paths, which can be calculated using the conversions 704 column. Dimensional path 600 is aggregated with other similar paths in row 708. Dimensional paths that are the same length and have the same dimensional data in corresponding dimensional elements can be aggregated together. Row 708 informs a user that there were 346 conversions of a total value of $3,959 whose dimensional path was spring_sale (campaign)>unavailable (default value)>spring sale (campaign), where the dimension is shown in parentheses. Dimensional row 620 is aggregated with other similar paths in row 710. The number of conversions and the total value of those conversions are also shown in row 710. As discussed above, the "unavailable" dimensional elements shown in the report 700 are based upon user interactions that did not have dimensional data associated with any of the dimensions from the list of dimensions used to generate the dimensional paths. In the case of report 700, the sorted list of dimensions included only the campaign dimension.

FIG. 7B illustrates a portion of a dimensional path report 750 based on aggregated dimensional paths converted from conversion paths as discussed with respect to FIG. 6B. As discussed above, the dimensional paths illustrated in FIG. 6B were generated from conversion paths using a priority list of dimensions including, in order, the campaign dimension, the keyword dimension, and a combination of the source and medium dimensions. The dimensional elements, therefore, may contain data from one or more of these dimensions. Similar to the portion of the report 700, the portion of the report 750 contains three columns corresponding to dimensional paths 752, a number of conversions of the particular dimensional path 754, and the value of those conversions 756. The data illustrated in FIG. 7B is the same data that is illustrated in FIG. 7A. Differences between FIGS. 7A and 7B are attributable to how the dimensional paths were generated. The dimensional path 540 is aggregated with similar dimensional paths in row 758, and the dimensional path 560 is aggregated with similar dimensional paths in row 760.

FIG. 7B illustrates greater detail of dimensional paths compared to FIG. 7A. Row 708 of FIG. 7A is illustrated as two rows 760 and 762 of FIG. 7B. Row 760 illustrates a dimensional path of spring_sale (campaign)>sale (keyword)>spring_sale (campaign). The sale value is based upon the keyword campaign, which is the second dimension in the sorted dimension list that is used to generate the dimensional paths illustrated in report 750. The campaign dimension was the primary, or the first, dimension in the dimension list. The report 750 can illustrate if a dimensional element listed in column 752 contains data from the primary dimension or from some secondary dimension. A solid box, such as 770, can be drawn a particular dimensional element to indicate that the data is from the primary dimension. A broken box, such as 768, can be used to indicate that the data is from a secondary dimension. The indication of what dimensional element is used can also be visualized by fonts, font colors, background color, outline colors, etc. For example, red text could indicate a primary dimension, orange a secondary dimension, yellow a tertiary dimension, etc.

Returning to rows 760 and 762, row 762 corresponds to a dimensional path of spring_sale (campaign)>direct/none (source/medium)>spring_sale (campaign). The second elements in the dimensional paths 760 and 762 are based upon a secondary dimension from the sorted dimension list. Unlike row 708 from FIG. 7A, rows 760 and 762 contain information from the corresponding user interaction when the primary dimension did not have corresponding data. Accordingly, rows 760 and 762 provide a finer granularity view of row 708.

Rows 758 and 766 correspond to row 710 of FIG. 7A. Row 710 of FIG. 7A includes two dimensional elements whose reported value is unavailable. These elements by themselves do not provide much useful information. Generating dimensional paths as discussed above in relation to FIG. 5B, however, allows more dimensional data to be reported to the user. Rows 758 and 766 contain information regarding dimensional paths whose last two elements are the same. The first dimensional elements, however, are different. The first dimensional element in row 756 corresponds to a keyword "coupons," and the first dimensional element in row 766 corresponds to a source/medium of "search engine/referral." This level of detail was not illustrated in FIG. 7A. An advertiser may determine that the dimensional path in row 766 to be highly effective, in that the 22 conversions had a relatively high value of $880. This information could be used by an advertiser to increase an advertising budget in regard to referral generated by the search engine with the goal of increasing the number of conversion paths that correspond to the divisional path shown in row 766. Using a number of dimensions to convert conversion paths to dimensional paths allows an advertiser to review more details of the conversion paths.

In one embodiment, the advertiser can select the dimensions and the order of the dimensions used to generate the dimensional paths. For example, the advertiser can select the dimensions using a web based interface. The priority list of dimensions can be saved for future use. In addition, an advertiser can save multiple different priority lists of dimensions. Labels can be attached to each list of dimensions to differentiate the different lists. The user interface can also allow an advertiser to modify or delete an existing list of dimensions. In addition, the advertiser can select a dimension list to generate a report that includes dimensional paths created from an advertiser's conversion paths based upon the selected dimension list.

When data relating dimensional paths is requested, the dimensional paths can be generated by the performance analysis apparatus 120. Alternatively, the conversion paths can be converted to dimensional paths at any point along the transmission of the conversion path data from a data source, such as the historical data store 119, to a user, such as at the user's browser. In another embodiment, the conversion path data is requested by and returned to a web server based upon a request from a user. The web server can convert the conversion paths into dimensional paths and then transmit a report or data including the dimensional paths to the user. In yet another embodiment, the conversion path data can be sent to a user. Instructions regarding how to convert the conversion path data to dimensional data can also be sent to the user. The instructions can then be used to convert the conversion paths into dimensional paths. For example, the conversion path data and embedded instructions can be sent to a user's browser, which can execute the embedded instructions to convert the conversion paths into dimensional paths. The instructions can also include instructions or code that can format and display the dimensional paths.

The advertisement management system 110 and/or the performance analysis apparatus 120 can be realized by instructions that upon execution cause one or more processing devices to carry out the processes and functions described above. Such instructions can comprise, for example, interpreted instructions, such as script instructions, executable code, or other instructions stored in a computer-readable medium. The advertisement management system 110 and/or the performance analysis apparatus 120 can be distributively implemented over a network, such as a server farm, or can be implemented in a single computer device.

Figure 8:
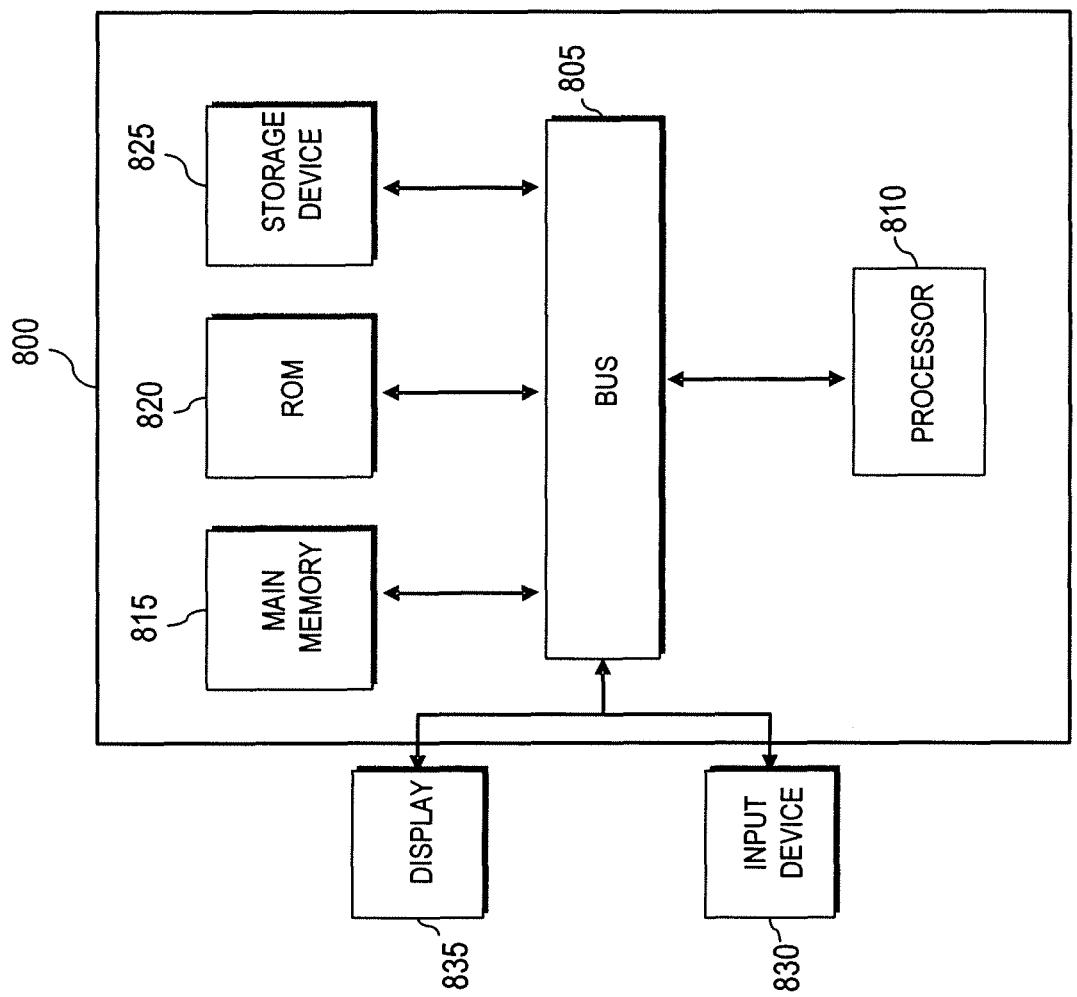
FIG. 8 is a block diagram of a computer system in accordance with an illustrative embodiment.

FIG. 8 illustrates a depiction of a computer system 800 that can be used to provide user interaction reports, process log files, implement an illustrative performance analysis apparatus 120, or implement an illustrative advertisement management system 110. The computing system 800 includes a bus 805 or other communication component for communicating information and a processor 810 coupled to the bus 805 for processing information. The computing system 800 also includes main memory 815, such as a random access memory (RAM) or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid state device, magnetic disk or optical disk, is coupled to the bus 805 for persistently storing information and instructions.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information, and command selections to the processor 810. In another embodiment, the input device 830 has a touch screen display 835. The input device 830 can include a cursor control, such as a mouse, a trackball, or cursor direction keys, for communicating direction information and command selections to the processor 810 and for controlling cursor movement on the display 835.

According to various embodiments, the processes that effectuate illustrative embodiments that are described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In alternative embodiments, hard-wired circuitry may be used in place of or in combination with software instructions to implement illustrative embodiments. Thus, embodiments are not limited to any specific combination of hardware circuitry and software.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of providing data related to conversion paths, the method comprising:
   receiving information regarding a plurality of conversion paths, wherein each conversion path comprises one or more user interactions, wherein a user interaction comprises a plurality of dimensional data that are related to the user interaction, wherein each conversion path corresponds to a single user, and wherein each conversion path ends with a conversion interaction;
   receiving a sorted list of dimensions, wherein the list of dimensions is sorted by priority, wherein the dimensions are data associated with user interactions;
   determining for each user interaction in each conversion path a dimension having dimensional data based upon the plurality of dimensional data associated with the user interaction and the sorted list of dimensions, wherein the determined dimension is a first dimension from the sort listed sorted list of dimensions having corresponding dimensional data associated with the user interaction;
   converting, using a processor, the plurality of conversion paths into a plurality of dimensional paths, wherein each dimensional path corresponds to one conversion path, wherein each dimensional path comprises one or more dimensional elements corresponding to user interactions of the corresponding conversion path, and wherein each dimensional element comprises the determined dimensional data from the corresponding user interaction;
   aggregating the plurality of dimensional paths based upon the number of dimensional elements within each dimensional path and the dimensional data of the dimensional elements; and
   providing information regarding the aggregated dimensional paths.

2. The method of claim 1, wherein each dimensional element comprises an indication of the selected dimension.

3. The method of claim 1, wherein each conversion interaction comprises a value dimension and corresponding value dimensional data.

4. The method of claim 3, further comprising aggregating the value dimensional data for each aggregated dimensional path.

5. The method of claim 1, further comprising providing instructions to display each dimensional element of the aggregated dimensional paths.

6. The method of claim 5, wherein the instructions to display each dimensional element comprise instructions to display a visual indication based upon the selected dimension.

7. The method of claim 1, further comprising providing a count of the number of dimensional paths aggregated into each aggregated dimensional path.

8. The method of claim 1, wherein selecting for each user interaction in each conversion path a dimension comprises selecting a default dimension.

9. A system comprising:
   one or more processors configured to:
      retrieve information regarding a plurality of conversion paths, wherein each conversion path comprises one or more user interactions, wherein a user interaction comprises a plurality of dimensional data that are related to the user interaction, wherein each conversion path corresponds to a single user, and wherein each conversion path ends with a conversion interaction;
      retrieve a sorted list of dimensions, wherein the list of dimensions is sorted by priority, wherein the dimensions are data associated with user interactions;
      determine for each user interaction in each conversion path a dimension having dimensional data based upon the plurality of dimensional data associated with the user interaction and the sorted list of dimensions, wherein the determined dimension is a first dimension from the sorted list of dimensions having corresponding dimensional data associated with the user interaction;
      convert the plurality of conversion paths into a plurality of dimensional paths, wherein each dimensional path corresponds to one conversion path, wherein each dimensional path comprises one or more dimensional elements corresponding to user interactions of the corresponding conversion path, and wherein each dimensional element comprises the determined dimensional data from the corresponding user interaction;
      aggregate the plurality of dimensional paths based upon the number of dimensional elements within each dimensional path and the dimensional data of the dimensional elements; and
      provide information regarding the aggregated dimensional paths.

10. The system of claim 9, wherein each dimensional element comprises an indication of the selected dimension.

11. The system of claim 9, wherein each conversion interaction comprises a value dimension and corresponding value dimensional data.

12. The system of claim 11, wherein the processor is further configured to aggregate the value dimensional data for each aggregated dimensional path.

13. The system of claim 9, wherein the processor is further configured to provide instructions to display each dimensional element of the aggregated dimensional paths.

14. The system of claim 13, wherein the instructions to display each dimensional element comprise instructions to display a visual indication based upon the selected dimension.

15. A non-transitory, tangible computer-readable medium having instructions stored thereon, the instructions comprising:
   instructions to retrieve information regarding a plurality of conversion paths, wherein each conversion path comprises one or more user interactions, wherein a user interaction comprises a plurality of dimensional data that are related to the user interaction, wherein each conversion path corresponds to a single user, and wherein each conversion path ends with a conversion interaction;

instructions to retrieve a sorted list of dimensions, wherein the list of dimensions is sorted by priority, wherein the dimensions are data associated with user interactions;

instructions to determine for each user interaction in each conversion path a dimension having dimensional data based upon the plurality of dimensional data associated with the user interaction and the sorted list of dimensions, wherein the determined dimension is a first dimension from the sorted list of dimensions having corresponding dimensional data associated with the user interaction;

instructions to convert the plurality of conversion paths into a plurality of dimensional paths, wherein each dimensional path corresponds to one conversion path, wherein each dimensional path comprises one or more dimensional elements corresponding to user interactions of the corresponding conversion path, and wherein each dimensional element comprises the selected dimensional data from the corresponding user interaction;

instructions to aggregate the plurality of dimensional paths based upon the number of dimensional elements within each dimensional path and the dimensional data of the dimensional elements; and instructions to provide information regarding the aggregated dimensional paths.

16. The non-transitory, tangible computer-readable medium of claim 15, wherein each dimensional element comprises an indication of the selected dimension.

17. The non-transitory, tangible computer-readable medium of claim 15, wherein each conversion interaction comprises a value dimension and corresponding value dimensional data.

18. The non-transitory, tangible computer-readable medium of claim 17, further comprising instructions to aggregate the value dimensional data for each aggregated dimensional path.

19. The non-transitory, tangible computer-readable medium of claim 15, further comprising instructions to provide data to display each dimensional element of the aggregated dimensional paths.

20. The non-transitory, tangible computer-readable medium of claim 19, wherein the instructions to display each dimensional element comprise instructions to display a visual indication based upon the selected dimension.

* * * * *